Patented Sept. 5, 1922.

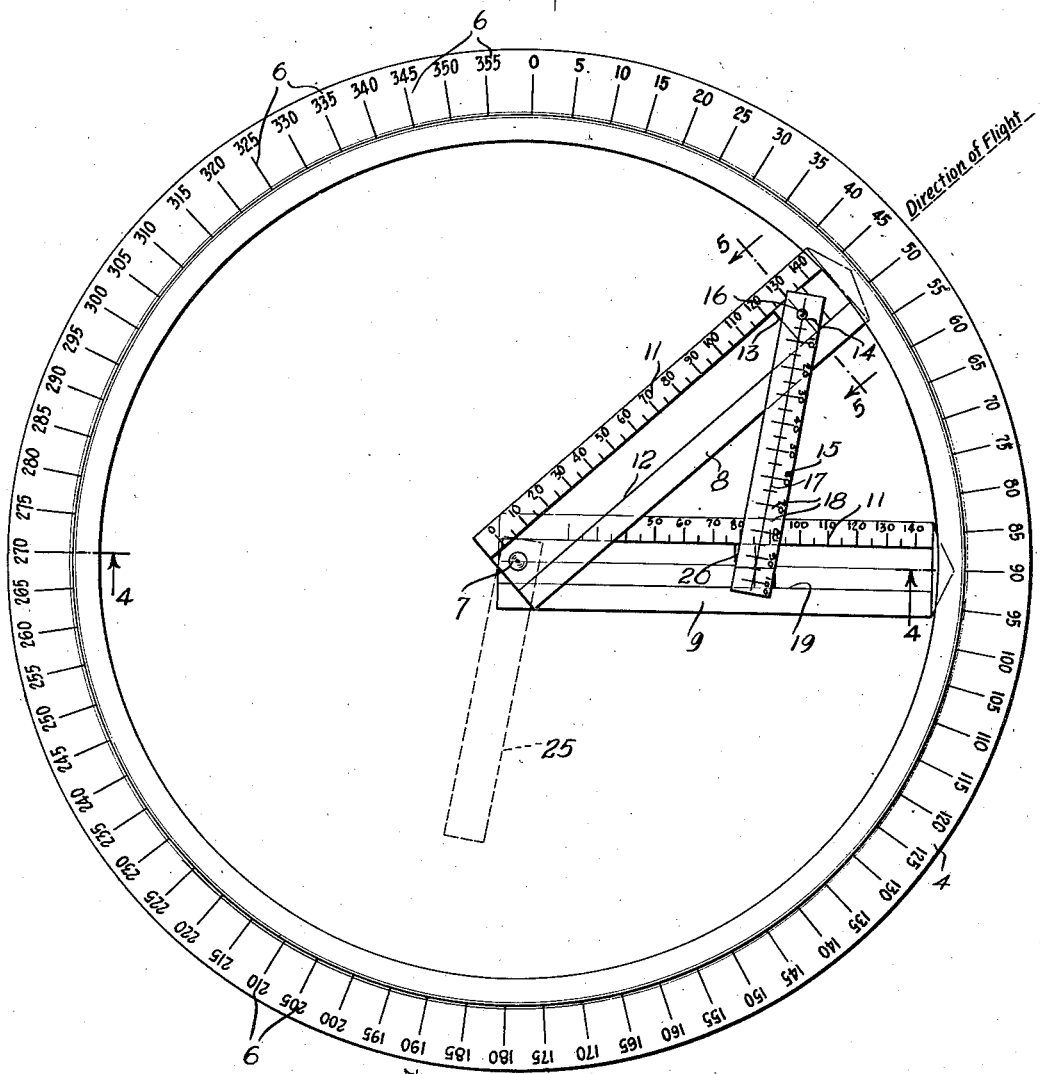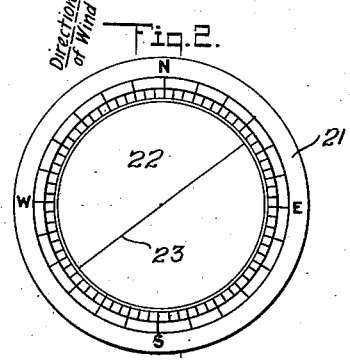

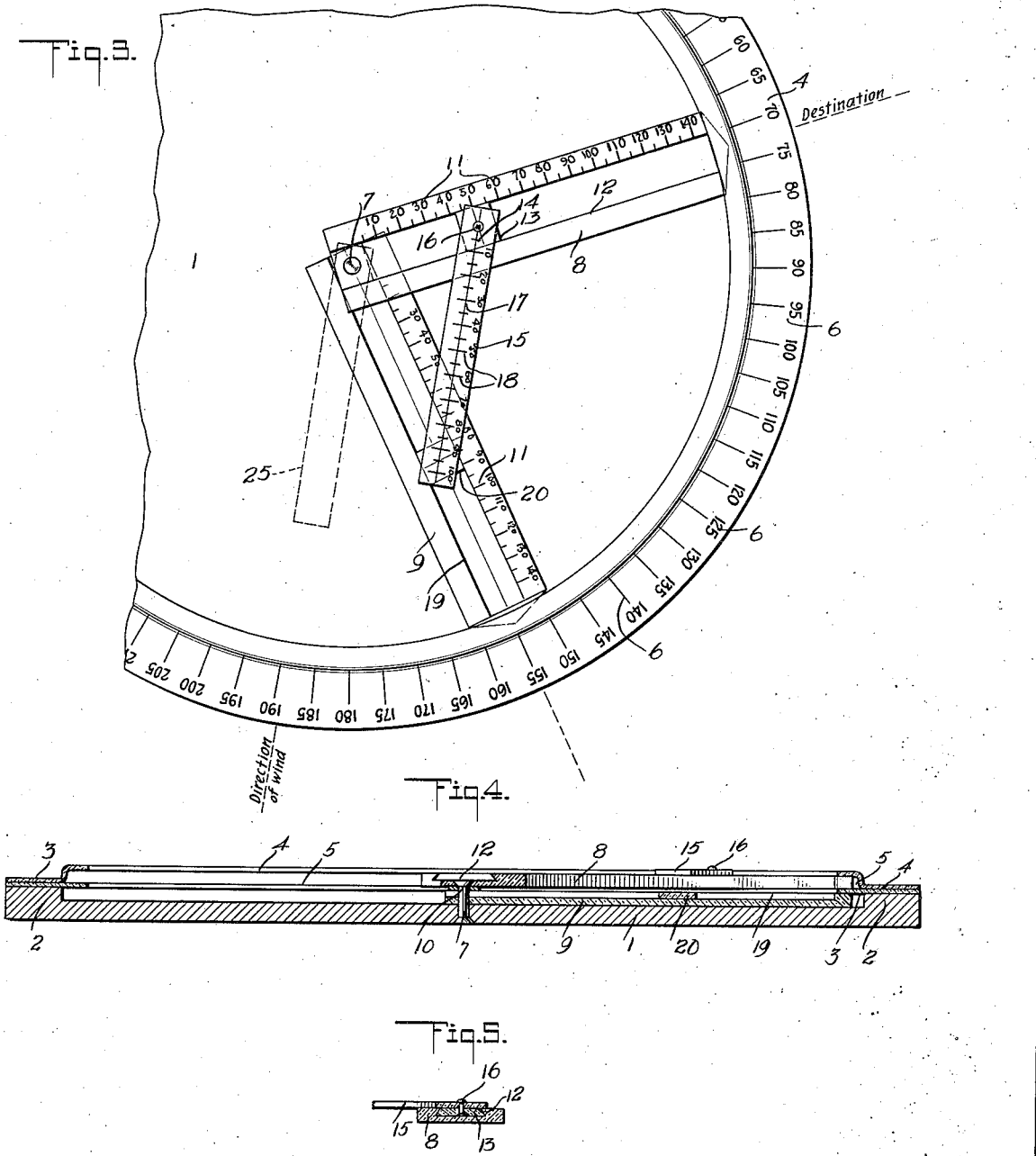

1,428,449

UNITED STATES PATENT OFFICE.

BRYAN W. PRALL, OF WEST NEW BRIGHTON, NEW YORK.

NAVIGATING INSTRUMENT.

Application filed March 16, 1921. Serial No. 452,638.

*To all whom it may concern:*

Be it known that I, BRYAN W. PRALL, a citizen of the United States, and a resident of the city of New York, West New Brighton, borough of Richmond, in the county of Richmond and State of New York, have invented a new and Improved Navigating Instrument, of which the following is a full, clear, and exact description.

This invention relates to improvements in navigating instruments, an object of the invention being to provide an instrument of this character for use on aeroplanes. To be more specific, the principal object of the invention is to provide an instrument of the character stated, which may be utilized to discover the direction in which an aviator must fly in order to proceed on a straight line to his destination having due regard for the direction and velocity of the wind.

A further object is to provide an instrument, which will not only indicate the direction in which the machine must be headed in order to fly straight to a given destination, but which will also indicate roughly the ground speed which will be made provided weather conditions remain the same.

Another object is to provide a navigating instrument with which wind velocity and direction may be determined while in the air.

A still further object is to provide a navigating instrument, with which a course may be plotted quickly and simply, and which will obviate the necessity of making mathematical calculations as to the direction in which a machine should be headed in order to make a straight course to a destination.

It is also an object of the invention to provide an instrument, which will be simple and practical in construction, durable and efficient in use, and unlikely to get out of order and comparatively inexpensive to manufacture.

With these and other objects in view, the invention consists in certain novel features of construction and combinations and arrangements of parts as will be more fully hereinafter described and pointed out in the claims.

In the accompanying drawings:—

Figure 1 is a plan view of my improved navigating instrument showing the parts in position to calculate wind speed and velocity;

Figure 2 is a top plan view of a device, which may be used to quickly ascertain the direction in which an aeroplane is flying over the ground;

Figure 3 is a top plan view of the navigating instrument showing the parts in position in indicate the direction in which the machine should be headed in order to fly a straight course to a destination after the direction and velocity of the wind have been determined;

Figure 4 is a view in section on the line 4—4 of Figure 1; and

Figure 5 is a view in section on the line 5—5 of Figure 1.

I have described the instrument as being intended for use on aeroplanes and shall hereinafter refer to it as being used on aeroplanes. It should be distinctly understood, however, that the navigating instrument may be used upon self-propelled flying craft of various descriptions, and the term "aeroplane" hereinafter used in the specification, shall be construed to mean self-propelled flying craft.

Referring in detail to Figures 1, 3, 4 and 5 of the drawings, 1 represents a circular base plate formed with a relatively wide upwardly peripheral flange 2. An annular transparent member 3 is fixed to the upper face of the flange 2. The outer edge of the member 3 is flush with the outer edge of the flange 2 and the inner edge of the member 3 extends inwardly over the inner edge of the flange.

Another annular transparent member such as 4 is positioned upon the member 3 and has its inner edge bent upwardly and then extending in parallelism with the member 3, so that an annular groove or channel 5 is provided between the inner edges of the members 3 and 4. Around the body portion of the member 4, graduations indicated by the reference numeral 6 are displayed, the ring 4 being graduated into 360 degrees.

An upwardly presented stud or pin 7 is fixed to the center of the base plate 1. A pair of transparent indicating arms 8 and 9 are pivoted at their inner ends one above the other on the stud 7, a gasket 10 preferably being interposed around the stud between the arms.

These arms are graduated from their inner to their outer ends, as indicated at 11. The arm 8 is formed with a central longitudinal groove 12, in which a transparent slide 13 is dovetailed. The slide is provided with a transverse hair line 14 adapted to register with the graduations 11 on the arm. An arm 15 has one end pivoted upon the upper face of the slide 13 by a pin or stud 16. This arm is provided with a central longitudinal hair line 17 intersected by transverse graduation lines 18. The arm 15 is graduated from its pivoted to its free end, the pivotal point being zero. The arm 15 is held against the slide 13 so tightly that it cannot be accidentally swung on its pivot but must be manually operated.

The arm 9 is also provided with a longitudinal groove 19 in which a slide 20 similar to the slide 13 is movable. The free end of the arm 8 is movable in the channel 5, and the free end of the arm 9 is movable between the base plate 1 and the inner edge of the member 3.

I have shown no mounting for the instrument, but it is preferably mounted upon any support whereon it may be rotated freely inasmuch as when the device is used, it is customary to rotate it until the zero point on the scale 6 is in a corresponding position to the zero point or due north on the aviator's compass.

In order to use the instrument to ascertain the direction and velocity of the wind, it is necessary to know the direction in which the plane is flying over the ground, the speed it is making over the ground, the speed it is making through the air and the direction in which the longitudinal axis of the plane is pointing.

Devices have been provided for calculating or indicating the air speed and the ground speed of the plane. The direction in which the longitudinal axis of the plane is headed may be ascertained by consulting a compass. In Figure 2 I have illustrated a device, which may be used to determine with a fair amount of accuracy, the direction in which the plane is traveling over the ground. This instrument comprises a graduated ring 21 in which a circular transparent member 22 is freely rotatable. A diametrical hair line 23 is provided on the member 22. By sighting the ground through the member 22 and turning the member 22 until the hair line is parallel with the direction of flight, the end of the hair line will indicate approximately on the center of graduated ring, the direction in which the machine is traveling.

The method of using the instrument after these ascertainable quantities of ground speed and direction and air speed and direction have become known ones, is as follows:—

Referring now to Figure 1 of the drawings, the arm 8 is swung to indicate on the scale 6, the direction in which the machine is traveling over the ground. The slide 13 is moved in the arm 8 until the hair line 14 registers with a point on the scale 11, which indicates the speed of the machine over the ground. The arm 9 is moved to indicate the direction in which the plane is headed and the slide 20 slid until its hair line indicates on the scale 11, of the arm 9, the air speed of the plane. It is then necessary to swing the arm 15 on its pivot and note the point on the scale 18, at which the hair line 17 intersects the center of the hair line on the slide 20. This will give a direct reading of wind velocity and by moving the slide 13 to the inner end of the slot 12, as indicated in dotted lines at 25, and swinging the arm 9 until the central hair line which is provided in this arm registers with the hair line on the arm 15, a direct reading of wind direction may be had upon the circular scale 6.

The mathematical correctness of these readings may be conclusively proved by applying the well recognized principle of the parallelogram of forces. The arm 8 and slide 13 represent the diagonal of the parallelogram, which is the resultant of the two forces of air speed and direction and wind velocity and direction. The arm 9 and slide 20 represent one of the known forces, namely, air speed and direction and constitute one side of the parallelogram, of which the arm 8 and slide 13 represent the diagonal. The direction and velocity of the force, which is represented by that side of the parallelogram which connects the end of the diagonal and the end of the first side, as indicated directly by the arm 15.

Knowing now the wind velocity and direction and the air speed in any direction, it is desirable to find out just which way the plane should be headed in order to fly a straight course to its destination.

This problem is worked out in Figure 3 of the drawings, the same principle of the law of forces being applied. The aviator consults a chart or uses what means may be available to discover the compass direction in which his destination lies. The arm 8 is moved to indicate such direction. This movement of the arm 8 will disturb the position of the arm 15 and it is again necessary to adjust the arm 15 to correctly indicate wind direction. The slide 20 in the arm 9 is not disturbed since the air speed is unchanged. The wind velocity and direction is also unchanged and so by moving the slide 13 up and down in its slot and swinging the arm 9 on its pivot until the point on the scale 18 representing wind velocity again registers with the hair line on the slide 20, representing the air speed. The arm 9 will point to the direction in which the plane should be headed in order to fly a straight line to the destination. The point on the scale 11 in the arm 8, which registers with the hair line 14 on the slide 13, will give a direct reading of the ground speed which will be made, so that the aviator may compute approximately the length of time which it will take to reach his objective flying in a straight line.

It is to be understood that the accompanying drawings are merely illustrative of one of the preferred embodiments of the invention, and that various slight changes and alterations might be made in the general form and arrangement of the parts described without departing from the invention and hence I do not wish to limit myself to the precise details set forth, but shall consider myself at liberty to make such slight changes and alterations as fairly fall within the spirit and scope of the appended claims.

When a machine which carries my improved instrument is in the air, it will of course be necessary to take readings at intervals, since weather conditions will not remain exactly the same and the direction and velocity of the wind may vary.

I claim:

1. An instrument of the character described, comprising a circular base plate, an upstanding peripheral flange around the base plate, a pair of radial indicating arms pivoted at the center of the base plate, a third indicating arm carried by one of the first mentioned arms, and means extending inwardly from said flange receiving and guiding the free ends of the first mentioned arms.

2. An instrument of the character described, comprising a circular base plate, an upstanding peripheral flange around the base plate, a pair of radial indicating arms pivoted at the center of the base plate, a third indicating arm carried by one of the first mentioned arms, said flange being provided with compass graduations upon which the free ends of the first mentioned arms are adapted to read, and an annular transparent strip extending inwardly from the flange and located between the free ends of said arms.

3. An instrument of the character described, comprising a circular base plate, an upstanding peripheral flange around the base plate, a pair of radial indicating arms pivoted at the center of the base plate, a third indicating arm carried by one of the first mentioned arms, said flange being provided with compass graduations upon which the free ends of the first mentioned arms are adapted to read, and an annular transparent strip extending inwardly from the flange and located between the free ends of said arms, said arms adapted to frictionally engage said strip, whereby the arms may be fixed in indicating position.

4. An instrument of the character described, including a circular base plate graduated peripherally into compass directions, a pair of radial arms pivoted one above the other at the center of the base plate and adapted to be set upon said graduations, said arms being graduated from their inner to their outer ends, and having longitudinal mortise grooves therein, slides mounted in said grooves, a third indicating arm pivotally mounted upon one of said slides and graduated from its pivoted to its free end, all of said slides and said arms being transparent, and said slides being provided with hair lines readable upon the graduations of the arms.

5. A navigating instrument for aeroplanes, comprising a circular base plate provided with peripheral compass graduations, a pair of radial indicating arms graduated from their inner to their outer ends and pivoted at the center of the plate, said arms adapted to read upon the compass graduations to indicate respectively air direction and ground direction of a plane, slides movable on the arms registering with the graduations on the arms to indicate respectively air speed and ground speed of a plane, and a third graduated arm pivotally mounted upon one of said slides, and graduated from its pivoted to its free end, said arm adapted to read upon the other slide to indicate wind velocity and upon the compass graduations to indicate wind direction, and frictional means preventing accidental displacement of all of said arms from indicating position.

6. A navigating instrument for aeroplanes adapted to indicate wind direction and velocity while flying, including a base plate provided with peripheral compass graduations, a pair of radial pivoted graduated indicating arms adapted to indicate respectively upon the compass graduations the direction of travel through the air and over the ground of a plane, slides on said arms adapted to indicate respectively upon the graduations of the arms the air speed and ground speed of a plane, a third graduated arm pivoted on one of said slides and adapted to indicate directly upon the other slide wind velocity and upon the compass graduations wind direction.

7. An instrument of the character described, including a circular base plate, a peripheral upstanding flange around the base plate, an annular transparent member located on and overlapping the inner edge of the flange and cooperating with the base to form a channel, a transparent ring located upon said last mentioned member and bent to form an annular channel, graduated radial indicating arms pivoted one above the other at the center of the base plate and having their free ends movable in the channels, and a pivotally and slidably mounted indicating arm carried by one of said radial arms.

BRYAN W. PRALL.